United States Patent
Bianchi et al.

(10) Patent No.: US 10,018,284 B2
(45) Date of Patent: Jul. 10, 2018

(54) LAYING DEVICE AND METHOD FOR LAYING A PIPELINE ON THE BED OF A BODY OF WATER

(71) Applicant: SAIPEM S.p.A., San Donato Milanese (IT)

(72) Inventors: Stefano Bianchi, Cernusco Sul Naviglio (IT); Mauro Mottini, Travaco Siccomario (IT)

(73) Assignee: SAIPEM S.P.A., San Donato Milanese (IT)

( * ) Notice: Subject to any disclaimer, the term of this patent is extended or adjusted under 35 U.S.C. 154(b) by 0 days.

(21) Appl. No.: 15/128,018

(22) PCT Filed: Mar. 25, 2015

(86) PCT No.: PCT/IB2015/052207
§ 371 (c)(1),
(2) Date: Sep. 21, 2016

(87) PCT Pub. No.: WO2015/145376
PCT Pub. Date: Oct. 1, 2015

(65) Prior Publication Data
US 2017/0108142 A1 Apr. 20, 2017

(30) Foreign Application Priority Data
Mar. 25, 2014 (IT) .................. MI14A0504

(51) Int. Cl.
*F16L 1/19* (2006.01)
*F16L 1/235* (2006.01)
*B63B 35/03* (2006.01)
*F16L 1/18* (2006.01)

(52) U.S. Cl.
CPC .............. *F16L 1/235* (2013.01); *B63B 35/03* (2013.01); *F16L 1/18* (2013.01)

(58) Field of Classification Search
CPC ....... F16L 1/12; F16L 1/14; F16L 1/15; F16L 1/16; F16L 1/18; F16L 1/19; F16L 1/235
USPC ................................. 405/158, 166, 169, 170
See application file for complete search history.

(56) References Cited

U.S. PATENT DOCUMENTS

2013/0142575 A1* 6/2013 Massari .................. F16L 1/225
405/166

FOREIGN PATENT DOCUMENTS

| GB | 2460671 | 12/2009 |
|----|---------|---------|
| GB | 2462656 | 2/2010 |

OTHER PUBLICATIONS

Notification Concerning Submission, Obtention or Transmittal of Priority Document for International Application No. PCT/IB2015/052207 dated Jul. 10, 2015.

(Continued)

*Primary Examiner* — Sunil Singh
(74) *Attorney, Agent, or Firm* — Neal, Gerber & Eisenberg LLP (57) ABSTRACT

A laying device configured to lay a pipeline on the bed of a body of water having a frame; a movable member mounted on the frame and configured to be placed in contact with a pipeline extending along a longitudinal axis and equipped with special parts; and at least one actuator configured to transmit rotation to the movable member to apply corrective torsion on the pipeline.

35 Claims, 10 Drawing Sheets

(56) References Cited

OTHER PUBLICATIONS

International Search Report and Written Opinion for International Application No. PCT/IB2015/052207 dated Jun. 30, 2015.
PCT Demand for International Preliminary Examination and Reply to International Search Report and the associated Written Opinion for International Application No. PCT/IB2015/052207 dated Jan. 25, 2016.
Notification of Receipt of Demand by Competent International Preliminary Examining Authority (Form PCT/IPEA/402) for International Application No. PCT/IB2015/052207 dated Jan. 29, 2016.
Second Written Opinion of the International Preliminary Examining Authority for International Application No. PCT/IB2015/052207 dated Feb. 23, 2016.
Reply to the Second Written Opinion of the International Searching Authority for International Application No. PCT/IB2015/052207 dated Apr. 20, 2016.
Notification of Transmittal of the International Preliminary Report on Patentability (Form PCT/IPEA/416) for International Application No. International Application No. PCT/IB2015/052207 dated Jul. 4, 2016.

* cited by examiner

LAYING DEVICE AND METHOD FOR LAYING A PIPELINE ON THE BED OF A BODY OF WATER

PRIORITY CLAIM

This application is a national stage application of PCT/IB2015/052207, filed on Mar. 25, 2015, which claims the benefit of and priority to Italian Patent Application No. MI2014A000504, filed on Mar. 25, 2014, the entire contents of which are each incorporated by reference herein.

BACKGROUND

Pipeline construction and laying is known to be carried out using laying vessels, which are equipped with production lines configured to construct the pipelines and laying devices configured to lay them. Pipeline construction and laying is carried out according to two chief methods, which are chosen depending on the depth of the seabed.

The first method, suitable for deep-water laying, contemplates making a pipeline using a substantially vertical production line and laying the underwater pipeline in a substantially vertical position, such that the pipeline assumes a J-shape in the section extending between the laying vessel and the bed of the body of water.

The second method, particularly suitable for laying in shallow to medium depth waters, contemplates making the underwater pipeline using a substantially horizontal production line and laying the underwater pipeline by a curved supporting structure, which has the function of guiding and supporting the underwater pipeline along a curved path that has a first part above the body of water, and a second part in the body of water. Underwater pipelines laid according to the second method assume an S-shape between the laying vessel and the bed of the body of water.

Pipelines of the above-indicated type comprise parts, such as valves for example, which radially protrude from the cylindrical profile of the pipelines. These parts are generally known as "special parts" or "bulky items", and require that the laying devices are configured to enable for their passage.

One known problem associated with laying pipelines with special parts is the pipeline rotating about its longitudinal axis while the pipeline is being laid. There can be various causes of pipeline rotation. In the J-lay configuration, the pipeline is mainly subjected to traction, and rotation can be caused by the action of a cross-current. The special part, which usually has rather relatively large cross-sections, tends to take a position that offers least resistance to the current, thereby inducing a localized twisting moment on the pipe that cancels out along the laying line. This twisting moment has the effect of producing a rotation of the part that grows as the depth of the bed of the body of water increases.

In the S-lay configuration, the bending moment caused by the curving of the pipeline during the laying stage brings the outermost fibres of the pipeline to a plastic state. Once the curved section of pipeline takes its rectilinear shape again and the state of traction reverts to prevailing over the state of flexure along the plasticized section, the redistribution of stress along the directrix of the pipeline becomes non-homogeneous due to the residual tension and causes torsional instability. In this condition, the pipeline turns around its axis to find a new configuration of equilibrium.

The rotation induced by the action of the currents on the special parts, and described with reference to J-laying, adds to this effect.

In any case, a special part has a tendency to turn about the axis of the pipeline according to a helical trajectory. Since special parts must be laid on the bed of the body of water on a particular side, rotation of the pipeline does not enable laying special parts in the correct configuration desired.

To overcome this drawback in at least intermediate waters, a float is connected to the special part to provide a force that maintains the desired orientation of the special part.

In deep waters, the configuration of the pipeline is nearly vertical and, in consequence, the action of the float is ineffective as the float is practically parallel to the pipeline. In this case, the float would be able to perform a corrective action only close to the bed of the body of water where the pipeline progressively assumes a horizontal configuration.

However, the action of the float limited to this short section proves to be insufficient.

The use of a float would also be impractical for correcting rotation of the special part when the rotation starts outside the body of water and is induced by plasticization.

Great Britain Patent No. GB 2,460,671 and Great Britain Patent No. 2,462,656 teaches the release torsional strain from a pipeline at a joining station.

SUMMARY

The present disclosure relates to a laying device configured to lay a pipeline on the bed of a body of water.

One advantage of the present disclosure is to provide a laying device capable of mitigating certain of the drawbacks of certain of the known art.

In accordance with the present disclosure, a laying device is provided for laying a pipeline on the bed of a body of water, the laying device comprising a frame; at least one movable member mounted on the frame and configured to be placed in contact with a pipeline extending along a longitudinal axis; at least one actuator configured to transmit rotation to the movable member to apply corrective torsion on the pipeline; and a control system configured to acquire signals related to the torsional state of the pipeline in the body of water and configured to control the movable member on the basis of the acquired signals, so as to apply a desired corrective torsion on the pipeline, wherein the control system comprises a control unit and an underwater sensor to detect twisting of the pipeline and a special part attached in the pipeline. In this way, it is possible to prevent or correct possible undesired twisting of the pipeline.

By monitoring the pipeline, it is possible to modulate the corrective torsion.

In accordance with the present disclosure, the movable member comprises a gripping device configured to selectively grip and release the pipeline; said frame being connected to a supporting structure to selectively rotate about the longitudinal axis of the pipeline. This solution is particularly convenient because the laying device rotates the gripping device of the pipeline feed system.

In particular, the laying device comprises a connecting system configured to suspend the frame from the supporting structure. In certain embodiments, the connecting system comprises connecting rods hinged to the frame and the supporting structure by universal joints. This is a relatively simple system to enable the frame to rotate a few degrees.

In certain embodiments, the device comprises a plurality of actuators connected to the frame and the supporting structure to rotate the frame and the gripping device with respect to the supporting structure. The higher the number or quantity of actuators, the more the frame is stably constrained to the supporting structure, which in this case is a J-lay tower.

In accordance with a further embodiment of the present disclosure, the device comprises a plurality of movable members, each of which comprises a roller rotating about its axis of rotation. In this embodiments, the roller transfers a tangential force to the pipeline by friction.

In particular, the axes of rotation of the rollers are skewed and oblique with respect to the longitudinal axis of the pipeline. This configuration enables each roller to exchange a tangential force and an axial force with the pipeline.

The rotation of the rollers is implemented by an actuator, which in this case is a feed system configured to selectively feed the pipeline that, in turn, causes the rotation of the rollers. In this embodiment, the tilt of the axes of rotation of the rollers enables driving the rollers in rotation via the pipeline.

Advantageously, the device comprises at least one drive configured to adjust the tilt of the axis of rotation of the roller and consequently modulating the torsion applied to the pipeline.

In accordance with the present disclosure, the device comprises a plurality of clamps, each of which supports at least one roller and is hinged to the frame to move between a grip position and a release position.

In the release position, the clamps enable the special parts to pass and, in the grip position, enable modulating the pressure of the rollers on the pipeline.

In particular, the frame is supported on a laying vessel by shock absorbers to enable adjustment movements of the pipeline.

In accordance with certain embodiments the present disclosure, the frame is mounted on a supporting structure configured to support the pipeline in S-laying and the rollers are arranged to define a support cradle for the pipeline. In other words, the supporting structure is a laying ramp for the S-lay configuration and, at the same time, the laying device, configured to apply corrective torsion to the pipeline, defines a cradle of the laying ramp. These embodiments include that the laying device or cradle has rollers with skewed axes of rotation oblique with respect to the axis of the pipeline.

In accordance with certain embodiments of the present disclosure, the at least one actuator comprises a motor coupled to the rollers to rotate the rollers about their respective axes of rotation. In these embodiments, these are motorized rollers and are not driven in rotation by the pipeline. In this case, each axis of rotation is parallel to the longitudinal axis of the pipeline so as to maximize the force transmitted from the rollers to the pipeline.

The force transmitted from the rollers to the pipeline can be modulated by a plurality of clamps, each configured to support at least one roller.

In accordance with certain embodiments of the present disclosure, the frame is mounted on a laying vessel to slide in a feed direction parallel to the longitudinal axis. This solution enables avoiding relative movements between the pipeline and the rollers in the axial direction.

A further advantage of the present disclosure is to provide a method configured to lay a pipeline on the bed of a body of water that is devoid of certain of the drawbacks of certain of the known art.

In accordance with certain embodiments of the present disclosure, a method is provided for laying a pipeline on the bed of a body of water, the method comprising the steps of moving into contact with the pipeline at least one movable member mounted on a frame supported on a laying vessel; rotating the movable member to apply corrective torsion on the pipeline above the body of water; and acquiring signals related to the twisting of the pipeline in the body of water and controlling the movable member above the body of water on the basis of the acquired signals. In these embodiments, the corrective torsion can be modulated as a function of the acquired data. The purpose of the corrective torsion applied above the body of water is to prevent or correct twisting of the pipeline that takes place in the body of water and is easy to control.

In accordance with one embodiment of the disclosure, the method comprises the steps of selectively clamping and releasing the movable member to/from the pipeline; and rotating the frame and the movable member about the longitudinal axis of the pipeline with respect to a supporting structure supporting the frame. In other words, the movable member is defined by a gripping device that can rotate about the longitudinal axis of the pipeline. In the case in point, the supporting structure is a J-lay tower and the gripping device (i.e., the movable members), form part of a feeding device for the pipeline located on the J-lay tower. In this embodiment, corrective torsion is applied by the gripping device firmly gripping the pipeline and rotation of the gripping device.

In accordance with another embodiment of the present disclosure, the method contemplates applying corrective torsion by a plurality of movable members, each of which comprises a roller rotating about its axis of rotation. In this embodiment, corrective torsion is transmitted to the pipeline by the rollers or rolling bodies rotating in contact with the outer face of the pipeline.

Additional features and advantages are described in, and will be apparent from the following Detailed Description and the figures.

BRIEF DESCRIPTION OF THE DRAWINGS

Further characteristics and advantages of the present disclosure will become evident from the description that follows of some certain embodiments, with reference to the figures in the accompanying drawings, in which.

DETAILED DESCRIPTION

Figure 1:
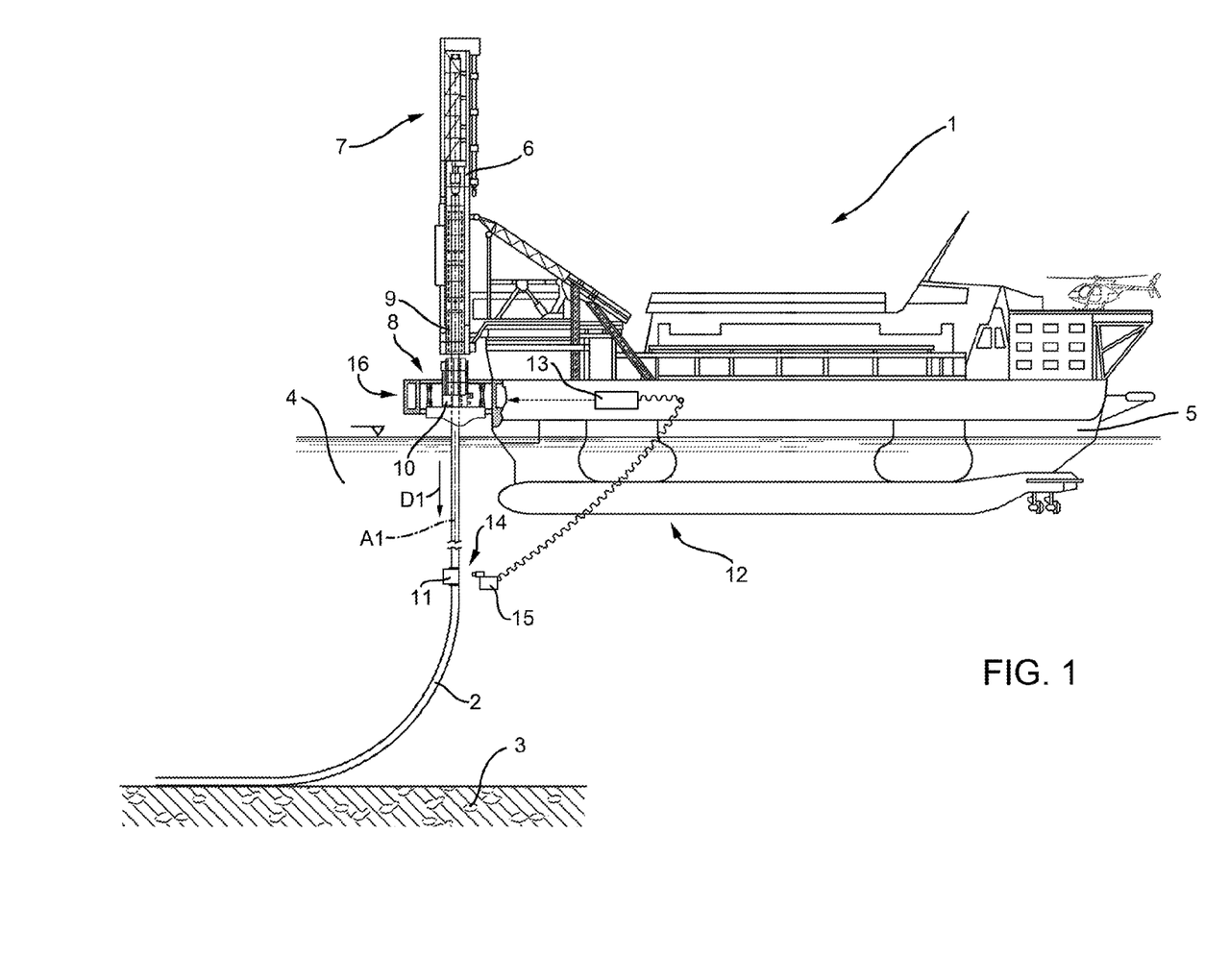
FIG. 1 is a side elevation view, with parts shown schematically and parts removed for clarity, of a laying vessel for J-laying pipelines and equipped with a laying device made in accordance with the present disclosure.

Referring now to the example embodiments of the present disclosure illustrated in FIGS. 1 to 16, with reference to FIG. 1, reference numeral 1 indicates, as a whole, a laying vessel configured to lay a pipeline 2 on the bed 3 of a body of water 4. The laying vessel 1 comprises a floating structure 5 and a supporting structure 6, which is hinged to the floating structure 5. In the case shown, the supporting structure 6 is a J-lay tower that houses an assembly line 7 configured to join pieces of pipe together (not shown in the accompanying figures) to build the pipeline 2, and a feeding system 8 to feed the pipeline 2 in a feed direction D1 with respect to the supporting structure 6 and the laying vessel 1. The feeding system 8 comprises a movable gripping device 9 selectively movable along the supporting structure 6 and a gripping device 10 substantially integral with the supporting structure 6 in direction D1.

The pipeline 2 has a longitudinal axis A1 and special parts 11, one of which is shown in FIG. 1. Special parts 11 consist of valves or other structures characterized by having a relatively significant bulk in the radial direction and being asymmetric with respect to the longitudinal axis A1 of the pipeline 2.

The laying vessel 1 has a control system 12, which comprises a control unit 13 and at least one sensor 14 configured to detect twisting of the pipeline 2 submerged in the body of water 3 and the position of the special part 11.

In the case shown, the sensor 14 is a video camera mounted on an underwater ROV 15 connected to the control unit 13.

The laying vessel 1 comprises a laying device 16 configured to rotate about the longitudinal axis A1 of the pipeline 2 to apply corrective torsion to the pipeline 2, if necessary, to compensate for and/or prevent undesired twisting of the pipeline 2 induced by external factors, such as marine currents, or structural factors, such as surface plasticization of the pipeline 2.

The entity of the corrective torsion applied to the pipeline 2 is determined based on the data acquired by the control system 12. As such, the laying device 16 comprises movable members configured to be placed in contact with the pipeline 2 that, in the case shown, comprise the gripping device 10.

Figure 2:
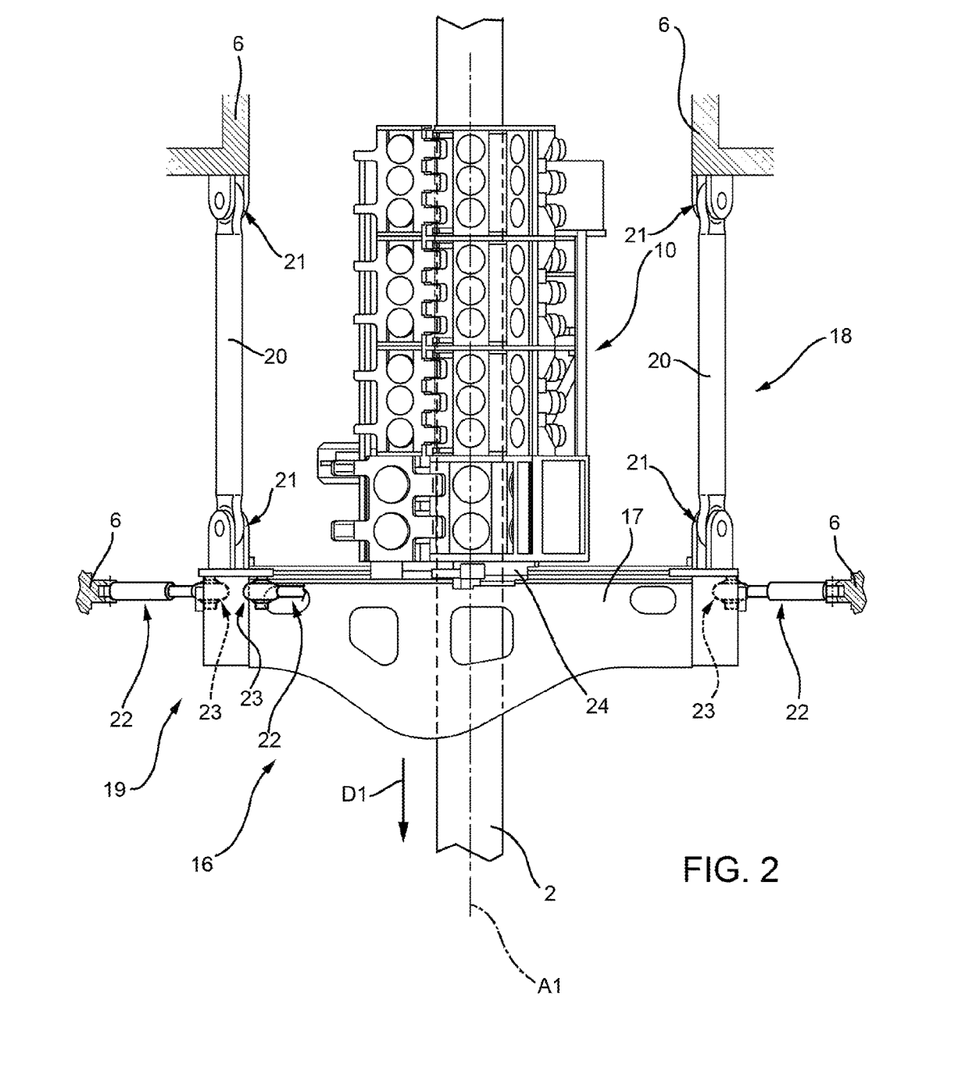
FIG. 2 is an elevation view, on an enlarged scale and with parts removed for clarity, of a laying device made in accordance with the present disclosure.

With reference to FIG. 2, the laying device 16 comprises a frame 17; a connecting system 18 for connection to the supporting structure 6; and an actuating system 19 to rotate the frame 17 with respect to the supporting structure 6. In the case shown, the connecting system 18 comprises a plurality of connecting rods 20 connected to the frame 17 and the supporting structure 6 by universal joints 21. In effect, the frame 17 is suspended from the supporting structure 6 by the connecting rods 20.

Figure 3:
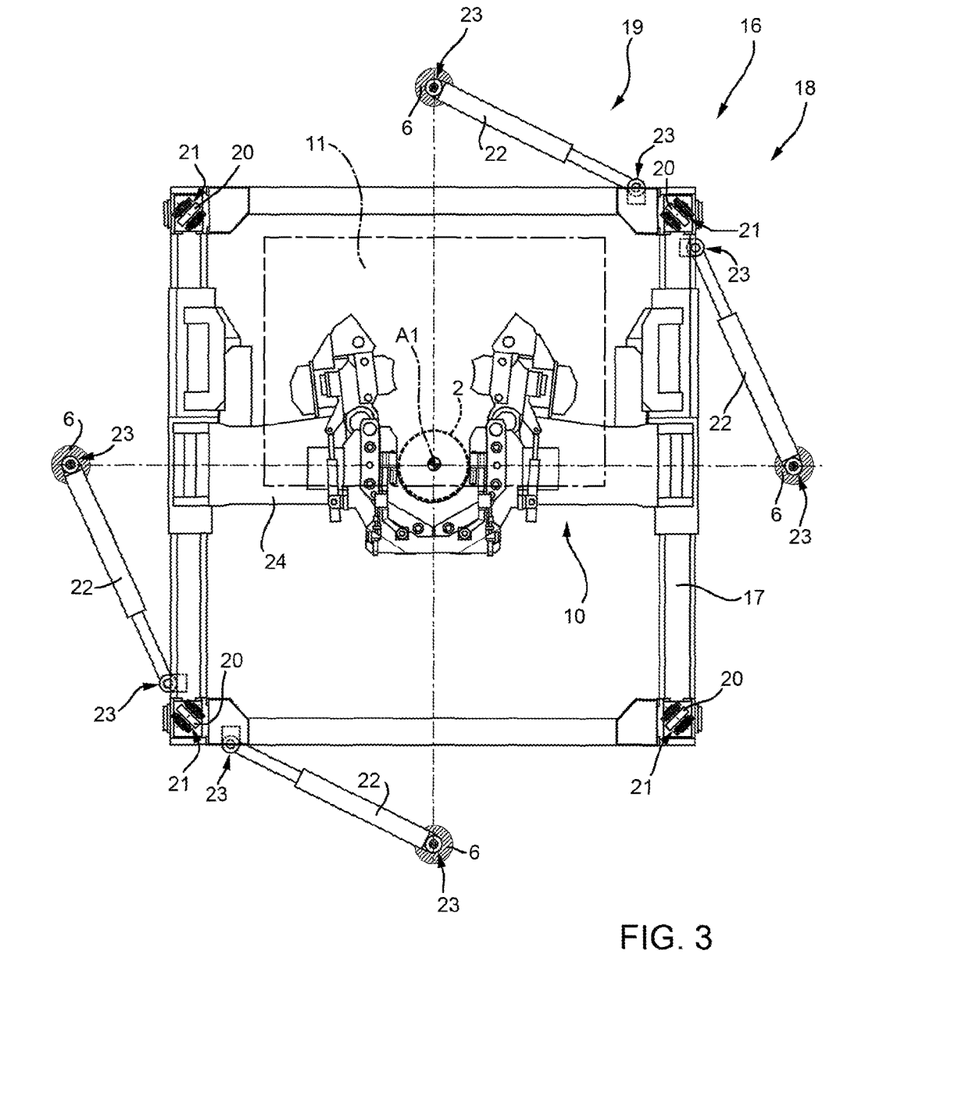
FIGS. 3 to 5 are plan views, with parts in section and parts removed for clarity, of the device in FIG. 2 in different operating configurations.

With reference to FIG. 3, the actuating system 19 provides further connection of the frame 17 to the supporting structure 6 by at least two actuators 22; in the case shown, there are four actuators 22. The ends of each actuator 22 are respectively connected to the frame 17 and to the supporting structure 6 by a universal joint 23.

In greater detail, the frame 17 is a four-sided frame, this being a square in the case shown. The laying device 16 comprises a carriage 24, which supports the gripping device 10 (i.e., the movable members) configured to be arranged to grip the pipeline 2 and movable along the frame 17 between a position in which the gripping device 10 is arranged around the pipeline 2 and a position in which the gripping device 10 is arranged in a position (not shown) away from the pipeline 2 to enable the transit of special parts 11 (FIG. 1).

Figure 4:
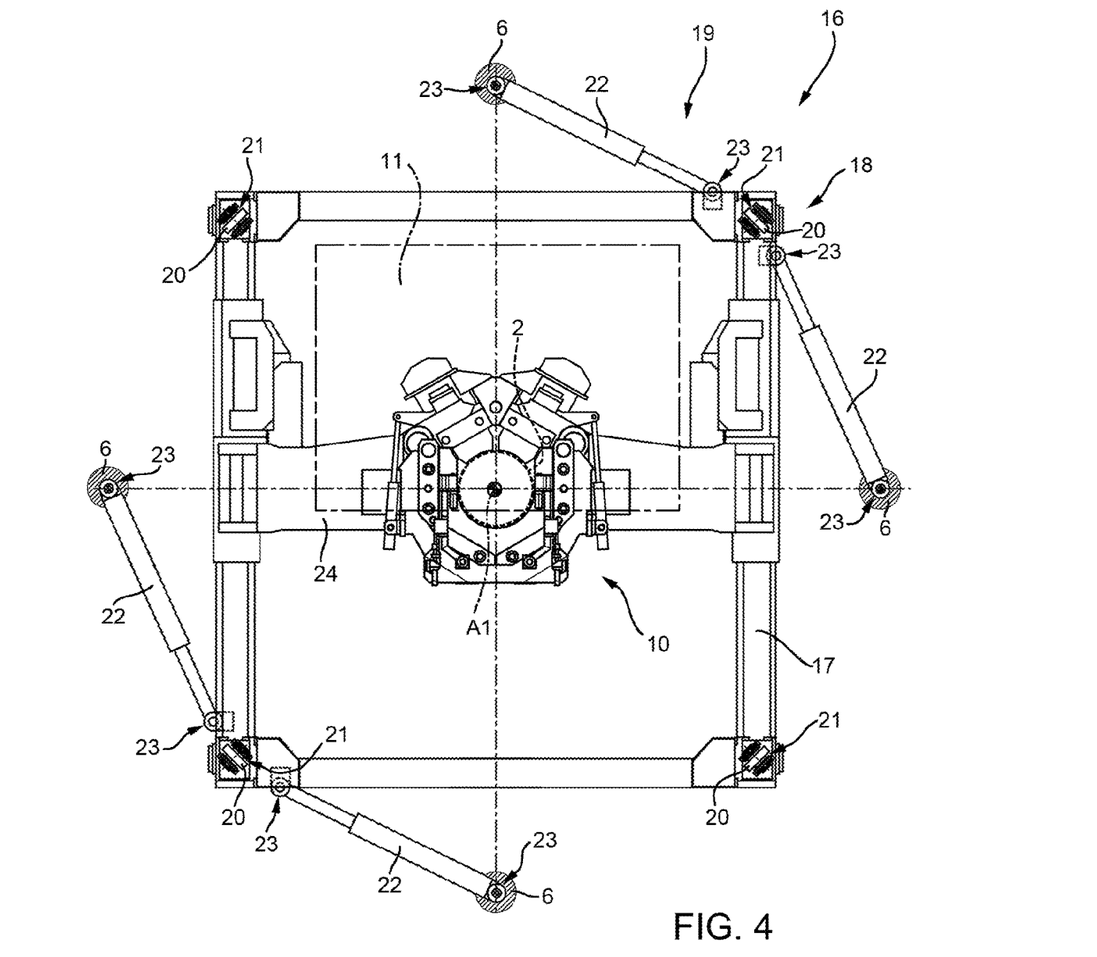
Figure 5:
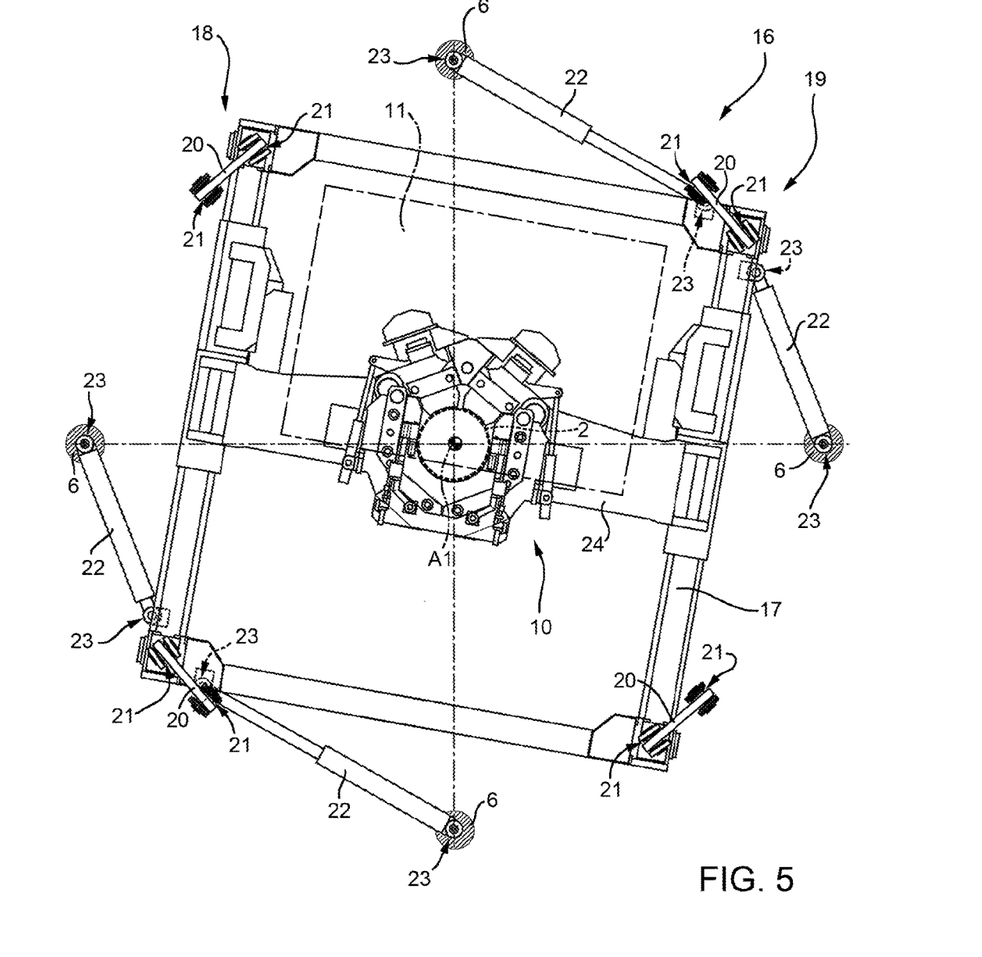

In FIG. 4, the gripping device 10 is gripping the pipeline 2, while in FIG. 5, the frame 17, the carriage 24 and the gripping device 10, always gripping the pipeline 2, are rotated about the longitudinal axis A1 by a few degrees to apply corrective torsion to the pipeline 2 based on parameters computed by the control system 12 in FIG. 1.

The laying device 16 is integrated in the feeding system 8 and makes controlled rotation of the gripping device 10 possible.

In use, and with reference to FIG. 1, the pipeline 2 is step-fed by the feeding system 8 as follows: when the movable gripping device 9 grips the pipeline 2, the gripping device 10 is released from the pipeline 2 and the movable gripping device 9 is advanced in direction D1. Once this advancement of the movable gripping device 9 terminates, the pipeline 2 is gripped by the gripping device 10 and released by the movable gripping device 9. In this step, a pause in the feeding of the pipeline 2, the gripping device 10 is rotated about the longitudinal axis A1 (FIG. 5) of the pipeline 2 by few degrees, if necessary, to apply corrective torsion to the pipeline 2 based on parameters computed by the control system 12 shown in FIG. 1. At the same time, the movable gripping device 9 is raised to a position where the movable gripping device can grip the pipeline 2 again before the latter is released by the gripping device 10. The gripping device 10, once it releases the pipeline 2, is returned to the "not rotated" configuration shown in FIG. 3.

In one embodiment (not shown in the accompanying figures), the movable gripping device 9 is replaced by a track tensioner in a fixed position with respect to the supporting structure 6.

Figure 6:
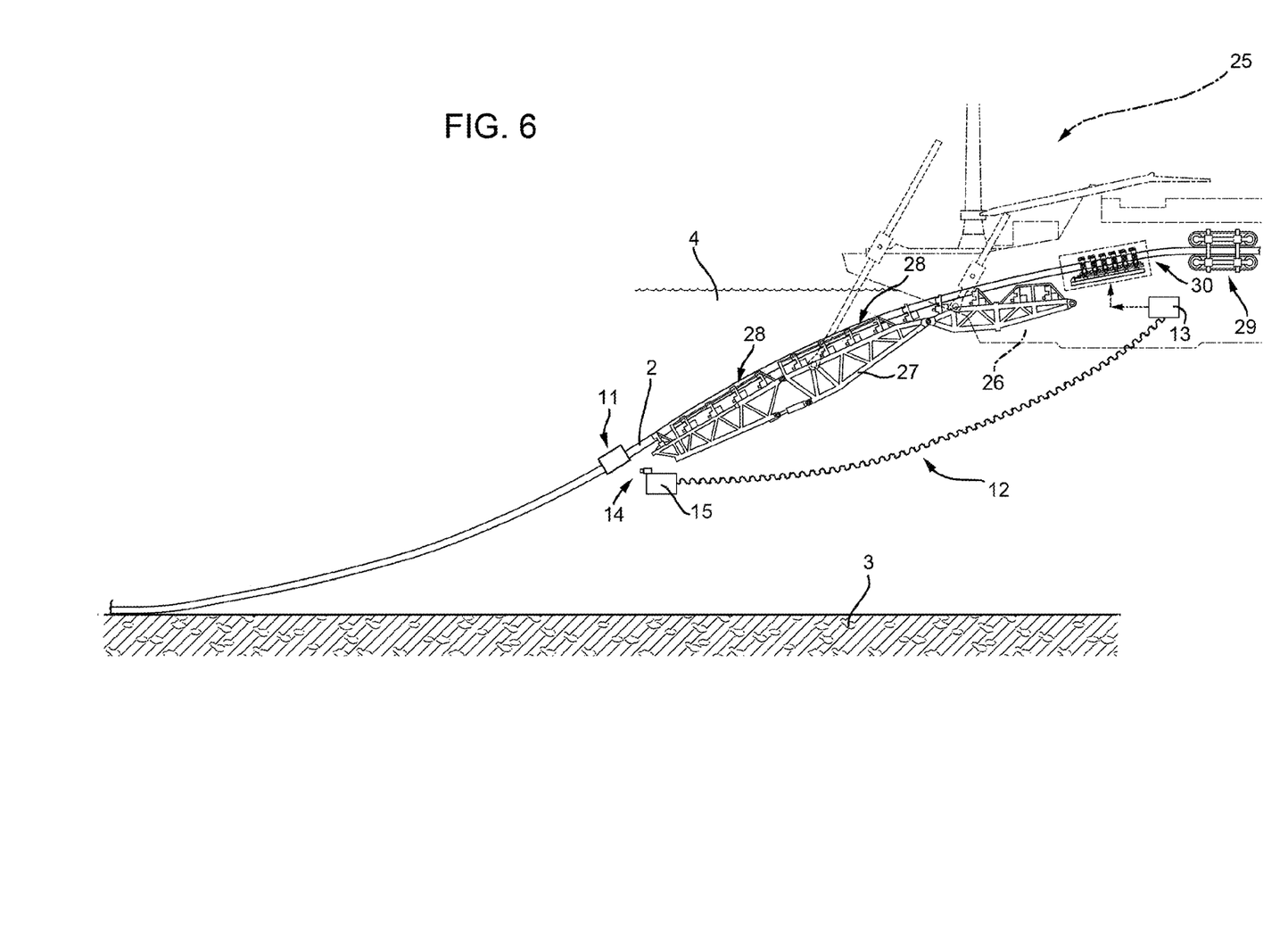
FIG. 6 is a side elevation view, with parts shown schematically and parts removed for clarity, of a laying vessel for S-laying pipelines and equipped with laying devices made in accordance with the present disclosure.

With reference to the embodiment in FIG. 6, reference numeral 25 indicates a laying vessel, which comprises a floating structure 26 and a supporting structure 27, which is configured to support the pipeline 2 and is hinged to the floating structure 26. In the case shown, the supporting structure 27 is an S-lay ramp equipped with cradles 28 to guide and support the pipeline 2 along a section of its path. The laying vessel 25 comprises a control system 12 comprising a control unit 13 and a sensor 14 to detect twisting of the pipeline 2 and the special part 11. In certain embodiments, the sensor 14 is defined by a video camera mounted on an underwater ROV 15.

The laying vessel 25 comprises a feeding system 29, for example a tensioner of the opposed-track type and configured to feed, brake and stop the pipeline 2 with respect to the laying vessel 25.

The laying vessel 25 comprises a laying device 30 arranged between the feeding system 29 and the supporting structure 27.

Figure 7:
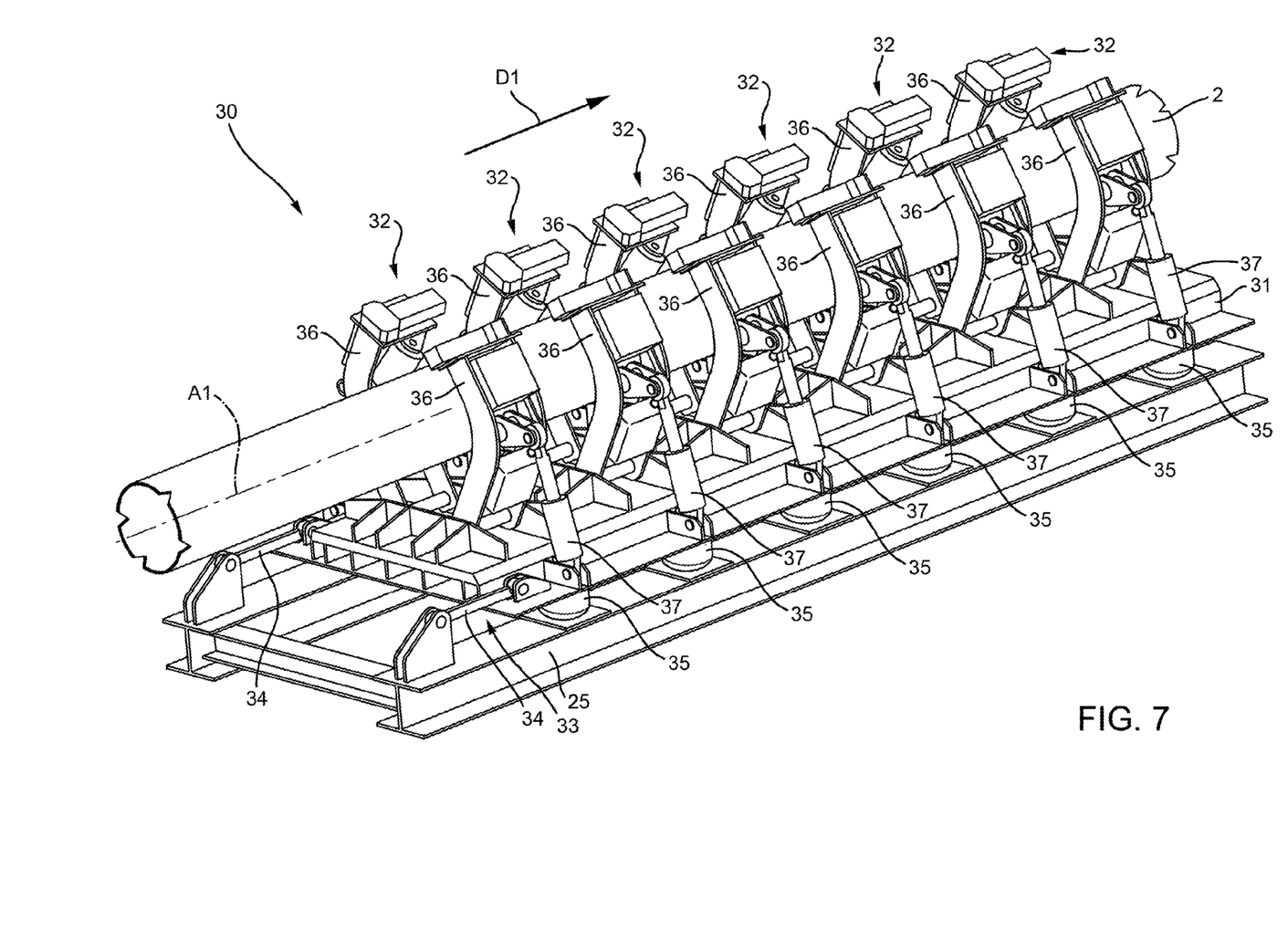
FIG. 7 is a perspective view on an enlarged scale, with parts in section and parts removed for clarity, of a laying device made in accordance with a further embodiment of the present disclosure.

With reference to FIG. 7, the laying device 30 comprises a frame 31; a plurality of guide devices 32 mounted on the frame 31 and arranged in succession; and a connecting system 33 configured to connect the frame 31 to the laying vessel 25.

The connecting system 33 comprises connecting rods 34, hinged to the frame 31 and the laying vessel 25, and shock absorbers 35 connected to the frame 31 and the laying vessel 25, to enable the frame 31 to tilt with respect to the laying vessel 25.

Figure 8:
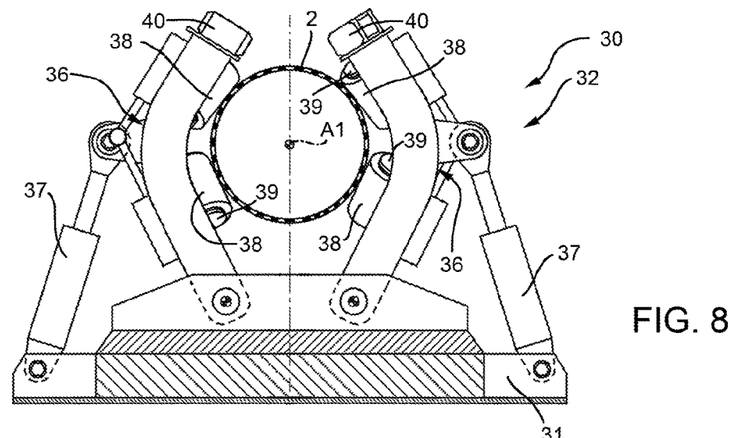
FIGS. 8 and 9 are elevation views, with parts in section and parts removed for clarity, of the laying device in FIG. 7 in an operating position and in a rest position, respectively.
Figure 9:
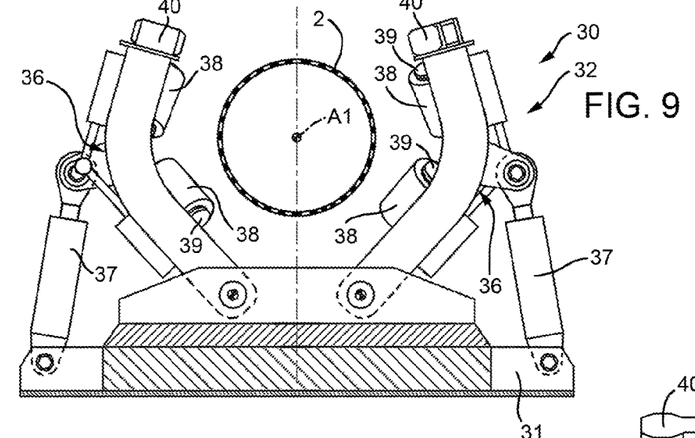

With reference to FIGS. 8 and 9, each guide device 32 comprises two clamps 36, which are hinged to the frame 31 and are operated by respective drives 37 between an operating position in which they are in contact with the pipeline 2 (FIG. 8) and a rest position (FIG. 9) in which they enable the passage of special parts 11 (FIG. 6).

Figure 10:
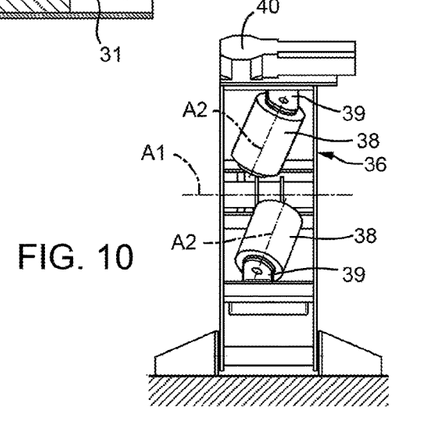
FIG. 10 is a side elevation view, with parts in section and parts removed for clarity, of a detail of the laying device in FIG. 7.

With reference to FIG. 10, each clamp 36 supports movable members that, in the case shown, comprise two rollers 38 rotating about respective axes of rotation A2. In this case, each roller 38 is mounted on a fork 39 adjustable by a respective drive 40 to alter the tilt of the rollers 38.

In certain embodiments, the axes of rotation A2 of the rollers 38 are skewed and oblique with respect to the longitudinal axis A1 of the pipeline 2, which by being arranged in contact with the rollers 38 causes them to rotate about the respective axes of rotation A2. As the axes of rotation A2 of the rollers 38 are skewed and oblique with respect to the longitudinal axis A1 of the pipeline 2, each roller 38 transmits, by friction, a tangential force to the outer face of the pipeline 2 and applies corrective torsion to the pipeline 2. In this case, the actuator that applied the corrective torsion is the feeding system 29 that controls the stopping and feeding of the pipeline 2. As such, the pipeline 2, in the feed steps in direction D1, has the function of a transmission member between the actuator (feeding system 29) and the rollers 38 and causes the rotation of the rollers 38 that, in turn, apply the corrective torsion to the pipeline 2. The entity of the corrective torsion applied to the pipeline 2 can vary according to the pressure applied by the clamps 36 and the tilt of the rollers 38.

Figure 11:
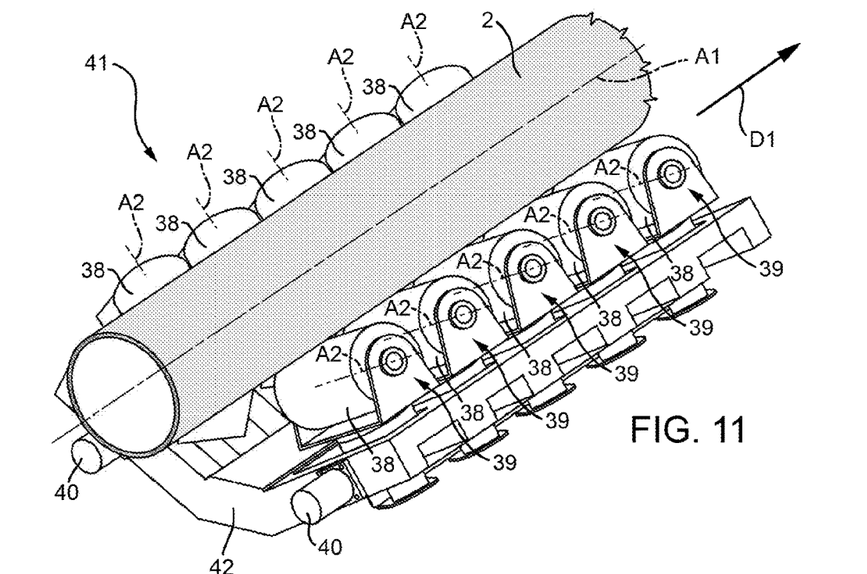
FIG. 11 is a perspective view, with parts removed for clarity, of a laying device made in accordance with a further embodiment of the present disclosure.
Figure 12:
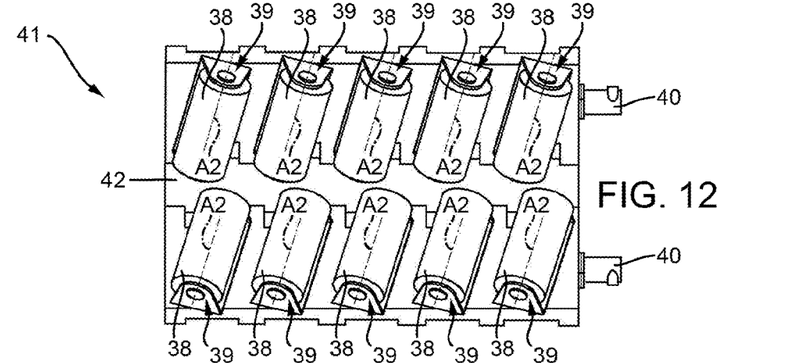
FIGS. 12 and 13 are plan views, with parts removed for clarity, of the laying device in FIG. 11.
Figure 13:
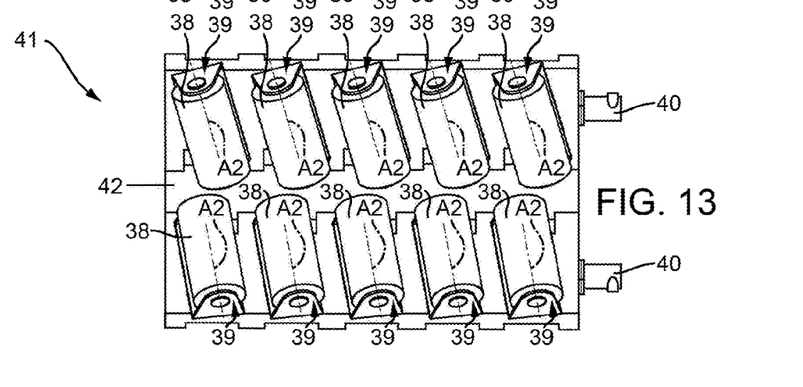

With reference to FIG. 11, the laying vessel 25 comprises one or more laying devices 41 arranged along the supporting structure 27 as an alternative to or in combination with laying device 30 to apply corrective torsion. Each laying device 41 is actually integrated in a cradle 28. In greater detail, and with reference to FIGS. 11 to 13, device 41 comprises a frame 42 on which rollers 38 are mounted, these rotating about respective axes of rotation A2 and fitted on respective forks 39 operated by respective drives 40. In the case shown, just one drive 40 is able to adjust the tilt of the axes of rotation A2 of a row of rollers 38. The principle of operation of laying device 41 is the same as that described with reference to laying device 30, with the difference that the forces exchanged between the pipeline and rollers 38 in laying device 41 depend on the mass of the pipeline 2 that rests on the rollers 38 and the tilting of the axes of rotation A2 of the rollers 38.

Figure 14:
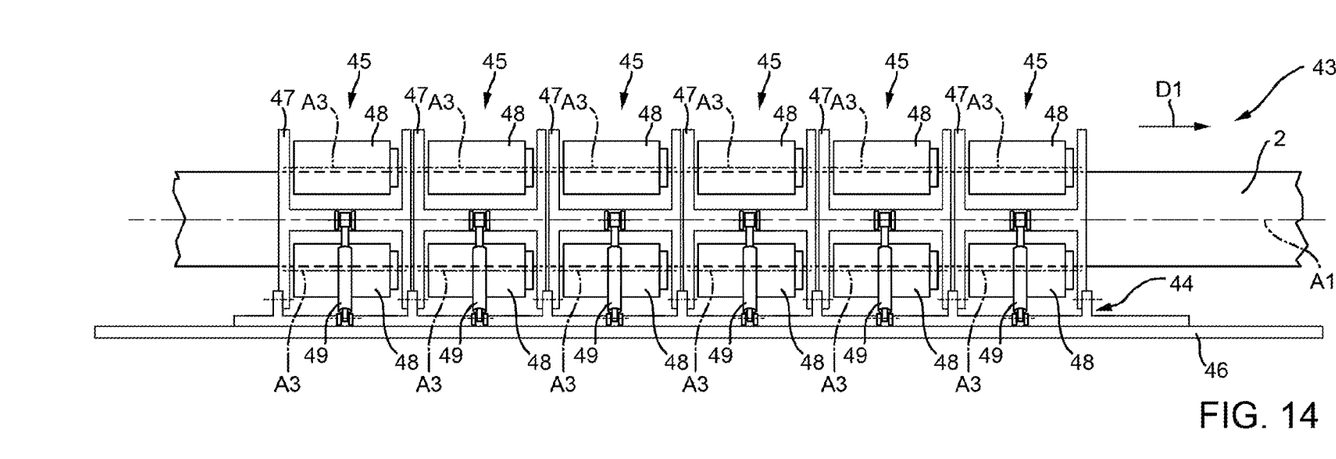
FIG. 14 is a schematic side elevation view, with parts removed for clarity, of a laying device made in accordance with a further embodiment of the present disclosure.

With reference to FIG. 6, as an alternative to laying device 30, the laying vessel 25 can be equipped with laying device 43, shown in FIG. 14.

With reference to FIG. 14, laying device 43 comprises a frame 44 and a plurality of gripping devices 45 movable between an operating position (FIG. 15), in which they grip the pipeline 2 and a rest position (FIG. 16), in which the gripping devices 45 are distant from the pipeline 2. In the case in point, the frame 44 is mounted to slide in the feed direction D1 of the pipeline 2 with respect to the laying vessel 25. In particular, and with reference to FIG. 14, the frame 44 is movable along the rails 46 in direction D1 together with the pipeline 2 when at least one gripping device 45 is gripping the pipeline 2 and is movable in the opposite direction to direction D1 by a drive (not shown in the accompanying figures), to return the gripping devices 45 to a position in which they will again grip the pipeline 2.

Figure 15:
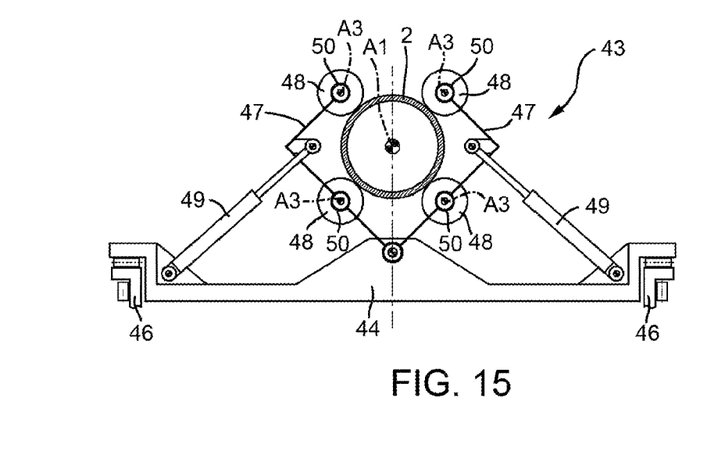
FIGS. 15 and 16 are schematic elevation views, with parts removed for clarity, of the laying device in FIG. 14.
Figure 16:
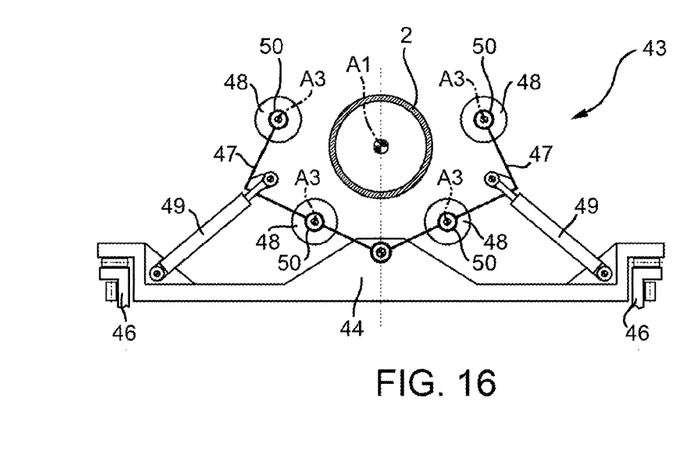

With reference to FIGS. 15 and 16, each gripping device 45 comprises two clamps 47; movable members 48 supported by the clamps 47 and configured to be arranged in contact with the pipeline 2; and drives 49 configured to operate the clamps 47 about respective axes parallel to the longitudinal axis A1 of the pipeline 2. Each clamp 47 comprises two movable members, which in the case shown are the rollers 48, each of which is motorized and rotates about a respective axis of rotation A3 and is configured to be arranged in contact with the outer face of the pipeline 2 to apply corrective torsion to the pipeline 2 about the longitudinal axis A1 of the pipeline 2.

In this case, each roller 48 is equipped with an actuator 50 that provides rotation about the respective axis of rotation A3.

Finally, it is evident that variants can be made to the present disclosure with respect to the embodiments described with reference to the accompanying drawings without departing from the scope of the appended claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A pipeline laying device comprising:
    a frame;
    a movable member mounted on the frame and configured to be placed in contact with a pipeline extending along a longitudinal axis;
    an actuator configured to cause the movable member to rotate to apply a corrective torsion on the pipeline; and
    a control system including:
        an underwater sensor configured to detect a twisting of a portion of the pipeline and a part asymmetrically attached, with respective to the longitudinal axis, to the pipeline in a body of water, and
        a control unit configured to:
            acquire signals related to the detected twisting of the portion of the pipeline in the body of water, and
            control the movable member based on the acquired signals to apply the corrective torsion on the pipeline.

2. The pipeline laying device of claim 1, wherein:
    the movable member includes a gripping device configured to selectively grip and release the pipeline, and
    the frame is connected to a supporting structure to selectively rotate about the longitudinal axis of the pipeline.

3. The pipeline laying device of claim 2, which includes a connecting system configured to suspend the frame from the supporting structure.

4. The pipeline laying device of claim 3, wherein the connecting system includes a plurality of connecting rods hinged to the frame and the supporting structure by a plurality of universal joints.

5. The pipeline laying device of claim 2, wherein the actuator is at least one of a plurality of actuators connected to the frame and the supporting structure to rotate the frame and the gripping device with respect to the supporting structure.

6. The pipeline laying device of claim 1, which includes another movable member including a roller configured to rotate about an axis of rotation.

7. The pipeline laying device of claim 6, wherein the frame is supported on a laying vessel by a plurality of shock absorbers.

8. The pipeline laying device of claim 6, wherein the axis of rotation of the roller is skew and oblique with respect to the longitudinal axis of the pipeline.

9. The pipeline laying device of claim 8, which includes at least one drive configured to adjust a tilt of the axis of rotation of the roller.

10. The pipeline laying device of claim 8, which includes a clamp which supports the roller and is hinged to the frame to move between a grip position and a release position.

11. The pipeline laying device of claim 8, wherein:
the frame is mounted on a supporting structure to support the pipeline as the pipeline is S-laid, and
the roller is arranged to at least partially define a supporting cradle for the pipeline.

12. The pipeline laying device of claim 6, wherein the actuator includes a motor connected to the roller to rotate the roller.

13. The pipeline laying device of claim 12, wherein the axis of rotation of the roller is parallel to the longitudinal axis of the pipeline.

14. The pipeline laying device of claim 13, which includes a clamp configured to support the roller and move between a position in which the roller is in contact with the pipeline and a release position.

15. The pipeline laying device of claim 12, wherein the frame is mounted on a laying vessel to slide in a feed direction parallel to the longitudinal axis of the pipeline.

16. A pipeline laying device comprising:
a frame;
a movable member mounted on the frame and configured to be placed in contact with a pipeline extending along a longitudinal axis;
an actuator configured to cause the movable member to rotate to apply a corrective torsion on the pipeline; and
a control system configured to control the movable member to apply the corrective torsion on the pipeline, wherein said control of the movable member is based on a detected underwater twisting of a portion of the pipeline and a part asymmetrically attached, with respect to the longitudinal axis, to the pipeline in a body of water.

17. The pipeline laying device of claim 16, wherein:
the movable member includes a gripping device configured to selectively grip and release the pipeline, and
the frame is connected to a supporting structure to selectively rotate about the longitudinal axis of the pipeline.

18. The pipeline laying device of claim 16, which includes another movable member including a roller configured to rotate about an axis of rotation.

19. A method of laying a pipeline on a bed of a body of water, the method comprising:
moving into contact with the pipeline a movable member mounted on a frame supported on a laying vessel;
acquiring signals related to a twisting of a portion of the pipeline in the body of water; and
rotating the movable member, based on the acquired signals, to apply a corrective torsion on the pipeline above the body of water by rotating a first roller of the movable member about an axis of rotation which is skew and oblique with respect to a longitudinal axis of the pipeline and selectively adjusting a tilt of the axis of rotation of the first roller, wherein the first roller is rotated by advancing the pipeline in contact with the first roller.

20. The method of claim 19, which includes:
selectively clamping and releasing the movable member to and from the pipeline; and
rotating the frame and the movable member about a longitudinal axis of the pipeline with respect to a supporting structure supporting the frame.

21. The method of claim 19, wherein the movable member includes a plurality of rollers including the first roller and which includes selectively gripping the pipeline between the rollers.

22. The method of claim 19, which includes cushioning a movement of the frame with respect to the laying vessel by a plurality of shock absorbers.

23. The method of claim 19, which includes guiding the pipeline, by the movable member, along a supporting structure, to support the pipeline as the pipeline is S-laid, wherein the first roller is arranged to at least partially define a supporting cradle for the pipeline.

24. A method of laying a pipeline on a bed of a body of water, the method comprising:
moving into contact with the pipeline a movable member mounted on a frame supported on a laying vessel;
acquiring signals related to a twisting of a portion of the pipeline in the body of water; and
rotating the movable member, based on the acquired signals, to apply a corrective torsion on the pipeline above the body of water by rotating a first roller of the movable member about an axis of rotation parallel to a longitudinal axis of the pipeline, wherein the first roller is rotated by a motor connected to the first roller.

25. The method of claim 24, which includes:
selectively clamping and releasing the movable member to and from the pipeline; and
rotating the frame and the movable member about a longitudinal axis of the pipeline with respect to a supporting structure supporting the frame.

26. The method of claim 24, wherein the movable member includes a plurality of rollers including the first roller and which includes selectively gripping the pipeline between the rollers.

27. The method of claim 24, which includes cushioning a movement of the frame with respect to the laying vessel by a plurality of shock absorbers.

28. The method of claim 24, which includes guiding the pipeline, by the movable member, along a supporting structure, to support the pipeline as the pipeline is S-laid, wherein the first roller is arranged to at least partially define a supporting cradle for the pipeline.

29. The method of claim 24, which includes selectively gripping the pipeline between a plurality of rollers including the first roller.

30. A method of laying a pipeline on a bed of a body of water, the method comprising:
moving into contact with the pipeline a movable member mounted on a frame supported on a laying vessel;
acquiring signals related to a twisting of a portion of the pipeline in the body of water; and
rotating the movable member, based on the acquired signals, to apply a corrective torsion on the pipeline above the body of water
by rotating a first roller of the movable member about an axis of rotation and moving the first roller and the frame together with the pipeline and with respect to the laying vessel, in a feed direction parallel to a longitudinal axis of the pipeline and in an opposite direction to the feed direction, wherein the first roller is rotated by a motor connected to the first roller.

31. The method of claim 30, which includes:
selectively clamping and releasing the movable member to and from the pipeline; and
rotating the frame and the movable member about a longitudinal axis of the pipeline with respect to a supporting structure supporting the frame.

32. The method of claim 30, wherein the movable member includes a plurality of rollers including the first roller and which includes selectively gripping the pipeline between the rollers.

33. The method of claim 30, which includes cushioning a movement of the frame with respect to the laying vessel by a plurality of shock absorbers.

34. The method of claim 30, which includes guiding the pipeline, by the movable member, along a supporting structure, to support the pipeline as the pipeline is S-laid, wherein the first roller is arranged to at least partially define a supporting cradle for the pipeline.

35. The method of claim 30, which includes selectively gripping the pipeline between a plurality of rollers including the first roller.

* * * * *